Nov. 28, 1967  J. P. MILLER  3,355,277
MOLD COOLING CONTROL APPARATUS FOR A GLASSWARE FORMING MACHINE
Filed Jan. 21, 1965  2 Sheets-Sheet 1
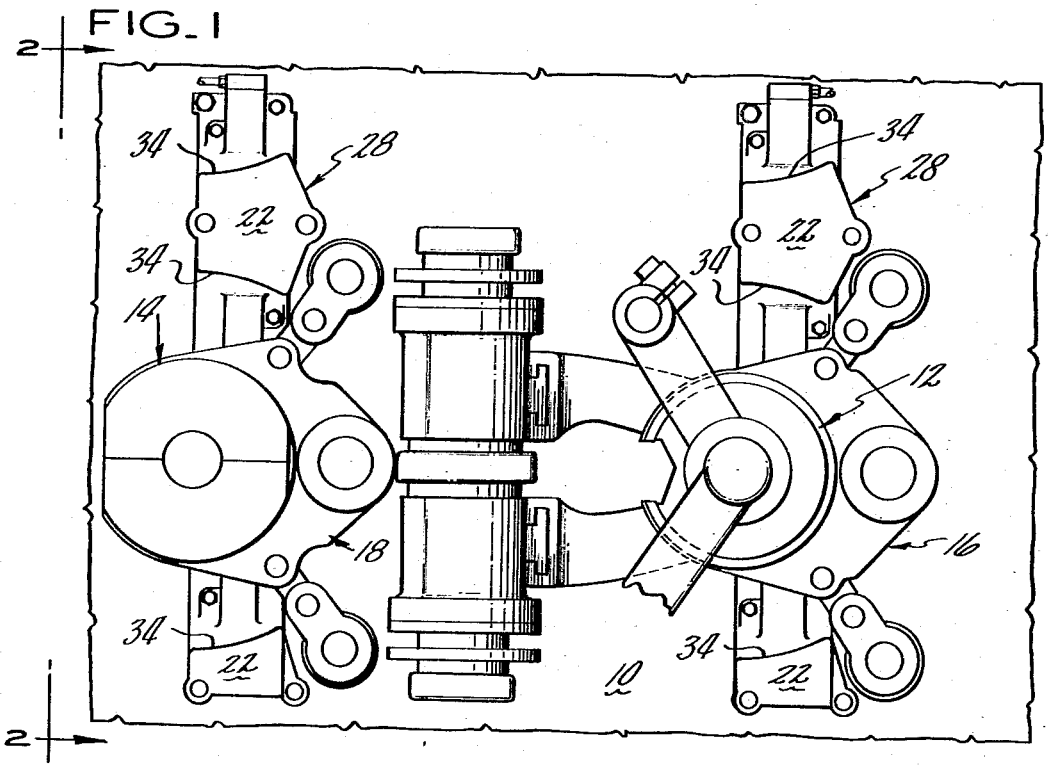
FIG_1
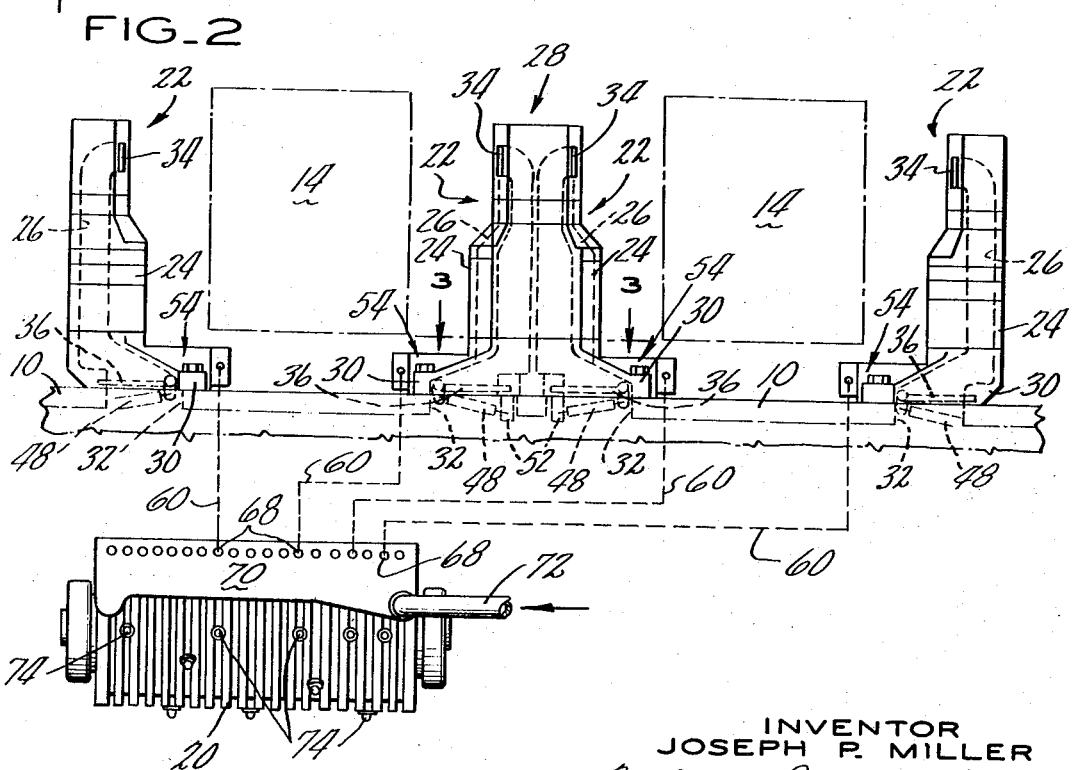
FIG_2
INVENTOR
JOSEPH P. MILLER
BY McCormick, Paulding & Huber
ATTORNEYS

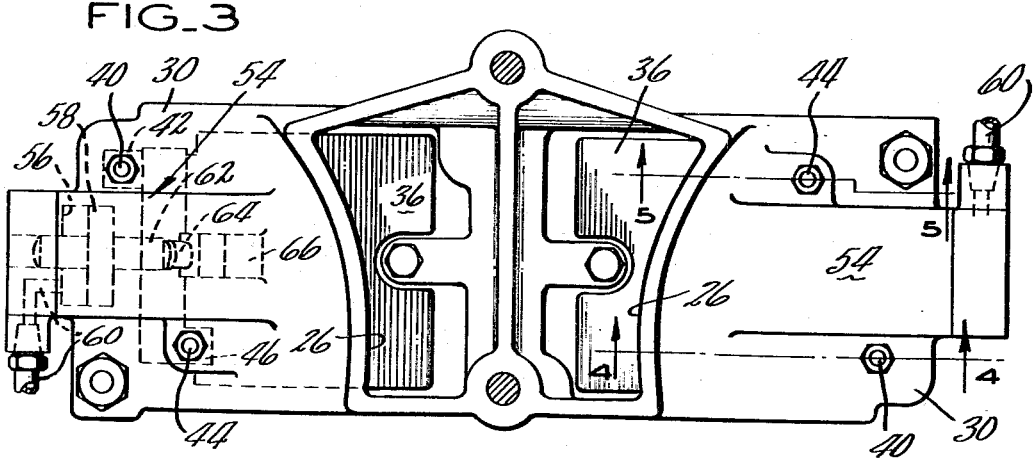
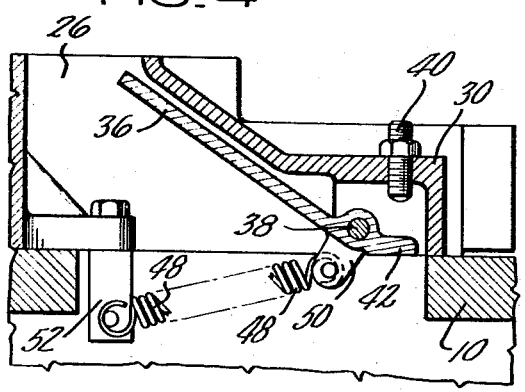
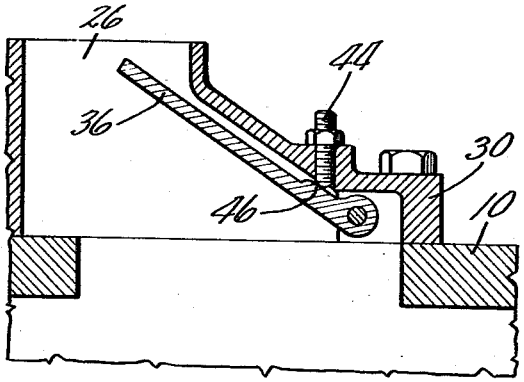
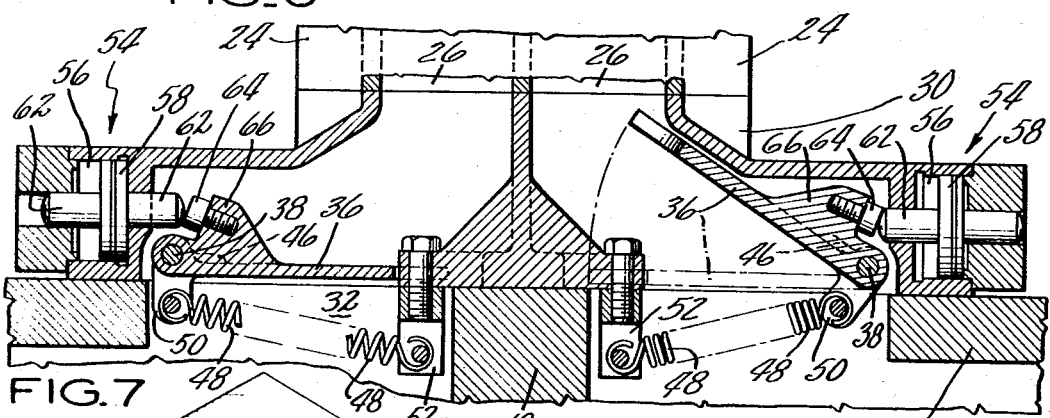
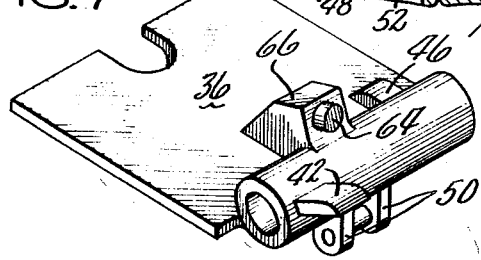

United States Patent Office 3,355,277
Patented Nov. 28, 1967

3,355,277
MOLD COOLING CONTROL APPARATUS FOR A GLASSWARE FORMING MACHINE
Joseph P. Miller, Tariffville, Conn., assignor to Emhart Corporation, Bloomfield, Conn., a corporation of Connecticut
Filed Jan. 21, 1965, Ser. No. 426,724
6 Claims. (Cl. 65—355)

This invention relates to an improved glassware forming machine and, more particularly, to an improved means for controlling the cooling of the molds of such glassware forming machine.

It is the general object of the invention to provide a cooling system control which will operate to accommodate maximum air flow and cooling under pressure (so as to satisfy the requirements of high speed production operation) when the forming machine molds are closed, and which will also operate to reduce air flow to a minimum or to a convenient rate when the molds are opened so as not be deleteriously affect the glassware parison or parisons at the blank and blow mold stations and the finished glassware at the blow mold station.

As will be understood from the following more detailed description, the present invention constitutes an improvement for a glassware forming machine of the type having at least one mold at a blank or parison forming station and at least one mold at a final shaping station. These molds are adapted to be opened and closed, the parison mold being closed to shape a gob of molten glass into a parison, and the final shaping mold being closed to shape the parison into the final form of the desired article of glassware. These molds are subjected to extreme heat from the molten glass, and it is necessary that they be cooled. It is customary to cool the molds by directing a stream or blast of cooling air at them. If this cooling airstream is directed toward the molds while they are opened, it can adversely affect the parison or the finished article of glassware, and it can also interfere with lubricating oil sprays directed to the molds.

The glassware forming machines to which the present invention is directed also include driven means for opening and closing the molds in timed relationship with each other in the cycling of the machine under continuous operation. This driven means includes a driven control member, which, in the well known Hartford I. S. Type Glassware Forming Machine, comprises a rotating control drum. This control drum carries adjustably located actuating elements or dogs on its periphery which operate valves and the like to control operation of the moving parts of the machine in timed relationship with each other. A disclosure of the Hartford I. S. Glassware Forming Machine is provided in United States Patent No. 1,911,-119 to Ingle, and this patent or its disclosure is incorporated by reference herein for the machine environment for the present invention, it being thought that the present invention is amply illustrated in the accompanying drawings without showing the entire glassware forming machine.

Such machines usually include conduit means associated with the respective molds to direct cooling air onto the molds, and this is shown in United States Patent No. 2,702,444 which is also incorporated herein by reference to avoid unnecessary complexity in the drawings illustrating the present invention. Such conduit means is provided with a base for securing the same to a bed or table of the glassware forming machine, the base being provided with an inlet opening affording connection with a source of cooling air under pressure. The conduit means also has a discharge opening for directing the cooling air onto an associated mold. Such conduit means may assume many shapes and sizes, and it is frequently desirable to make the conduit means in sections which can be readily connected and assembled or disassembled so as to provide the discharge opening at different elevations and to provide a selection for the elevation or location of the discharge opening most suitable to the mold being used.

The present invention provides a very desirable damper control for such conduit means, as will be more fully described hereinafter.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a plan view of a section of a glassware forming machine incorporating the improvement of the present invention, the said section including a blank mold and a final shaping of the mold;

FIG. 2 is an elevational view schematically illustrating the relationship of the final shaping mold of the machine section shown in FIG. 1 to the final shaping mold of an adjacent section of the glassware forming machine, and FIG. 2 also provides a schematic disclosure of the conduit means utilized for cooling the said molds;

FIG. 3 is a horizontal cross sectional view through a conduit means, the view being taken as indicated generally by the line 3—3 of FIG. 2;

FIG. 4 is a vertical cross sectional view illustrating a detail of the damper construction utilized in the conduit means, the view being taken generally as indicated by the line 4—4 of FIG. 3;

FIG. 5 is a generally similar view, the vertical section being taken as indicated generally by the line 5—5 of FIG. 3;

FIG. 6 is a vertical cross sectional view taken through the base portion of a composite or double conduit means adapted to serve two molds, and illustrating one damper in closed position and the other damper in open position;

FIG. 7 is a perspective view of a conduit damper provided in accordance with the present invention.

As shown in FIG. 1, and as shown in much greater detail in the aforementioned United States patents, a glassware forming machine of the type to which the present invention may advantageously be applied includes a base or table 10 over which a blank or parison forming mold 12 is located at a parison forming station, and a final shaping mold 14 is also located over the base 10 at a final shaping station. Each of these molds is adapted to be opened and closed, and drive means is incorporated in the glassware forming machine to effect such opening and closing operations. Such driven means includes the mold connecting elements and arms indicated generally at 16 and 18 respectively, and the driven means also includes a driven rotating control drum 20 (FIG. 2) which carries on its periphery a plurality of actuators. These actuators may operate valves to control fluid motor operation of the opening and closing of the respective molds 12 and 14 in timed relationship with each other. It should also be understood that the glassware forming machine to which this invention is adapted may comprise a plurality of sections, each including a blank or parison forming mold 12 and a final shaping mold 14 and the apparatus or elements associated therewith. FIG. 2 is taken to provide an end elevational view of two such sections wherein the final shaping molds 14, 14 are shown only in phantom.

As is shown in each of FIGS. 1 and 2, each mold 12 or 14 has associated therewith a conduit means indicated generally at 22 which is provided to direct a cooling airstream on one side of the mold, thus there are two such conduit means associated with each mold. Each such conduit means comprises a vertical multi-section stack 24 defining a conduit passage 26. For conveience, two such stacks are combined in a single structure 28 between adjacent molds. Each stack 24 or composite structure 28 is provided with a base 30, this base being utilized to mount the associated stack on the bed or table of the forming machine over a suitable opening, such as the opening 32 therein. Each opening 32 in the table 10 is connected with a source of cooling air under pressure (not shown), and each base has an inlet opening in communication therewith so that air will flow from the said source of air under pressure into the inlet opening of the base through the conduit passageway 26 to a discharge opening 34 which will direct the airstream onto the associated mold.

In accordance with the present invention, a damper 36 (FIGS. 4–7) is pivotally supported by each conduit means 24, preferably in the inlet opening of said conduit means. More specifically, the damper 36 is pivotally supported on the base 30 of the conduit means as by a pintle 38 so that it can swing from an open position to a closed position. The closed position of the damper 36 need not necessarily locate it to fully close the conduit passageway 26. That is, an adjustable stop 40 is supported on the base 30 to engage a lug 42 on the damper to fix the closed position thereof. A second adjustable stop 44 is supported on the base 30 to engage a boss 46 on the damper to fix the open position thereof. Normally, the damper is opened because a spring 48 is stretched between a lug 50 on the damper and a bracket 52 on the base 30 to bias the said damper toward open position.

The damper is moved toward closed position by a fluid motor 54 comprising a cylinder 56 and a piston 58. The piston moves in the cylinder responsive to fluid pressure in a passage 60 to thrust a plunger 62 into engagement with a seat 64 on a damper boss 66. When the piston 58 is moved responsive to fluid under pressure in the passage 60, the said plunger 62 pivots the damper 36 to shift it into closed position. When fluid pressure is removed from the passage 60, the damper returns to open position due to the force of the spring 48.

It will be readily understood that it is most desirable to provide the greatest amount of cooling air for each of the molds when closed. Accordingly, the passage 60 for the fluid motor associated with each damper of each conduit means should be subjected to fluid under pressure only at the time that the associated mold is open. This is accomplished as is illsutrated in FIG. 2. That is, each passage 60 is connected with a suitable valve at a port 68 in a bank of valves 70. The valve bank 70 comprising the plurality of valves is located adjacent the forming machine control drum 20. The valve bank is connected with a source of fluid under pressure (not shown) by a conduit 72 which supplies the fluid under pressure to all of the valves and through the valves to the various fluid motors 54, 54.

The control drum 20 carries a plurality of valve actuators, such as the members 74, to operate the respective valves in timed relationship with the machine operation which effects opening and closing of the various molds 12 and 14. These actuators are located on the periphery of the drum 20 so as to open flow between the fluid pressure conduit 72 and the fluid motor passage 60 only when the associated mold is open. Thus, each conduit means is opened for the flow of cooling air only when its associated mold is closed.

The invention claimed is:

1. An improvement for cooling a glassware forming machine of the type having at least one mold which can be closed to form molten glass and then opened for removal of the formed object, and also having driven means for opening and closing the mold including a driven control member operable to effect the opening and closing in timed sequence, the said improvement comprising conduit means having an outlet opening for directing cooling air onto said mold and having a base for mounting said conduit means on the machine and which defines an inlet opening connectible with a source of cooling air under pressure, a damper pivotally supported on said conduit means in one of its said openings for movement between a first position at least partially closing the associated opening and a second more open position, means biasing said damper into one of its said positions, a fluid motor operable responsive to fluid under pressure to place said damper in its other position, and control means for said fluid motor including a valve connected thereto and connectible with a source of fluid under pressure, and valve actuating means carried by the control member of the machine to operate said valve and thereby to direct more air onto the mold when it is closed.

2. An improvement for cooling a glassware forming machine of the type having at least one mold which can be closed to form molten glass and then opened for removal of the formed object, and also having driven means for opening and closing the mold including a driven control member operable to effect the opening and closing in timed sequence, the said improvement comprising conduit means having an outlet opening for directing cooling air onto said mold and having a base for mounting said conduit means on the machine and which defines an inlet opening connectible with a source of cooling air under pressure, a damper pivotally supported on said conduit means in one of its said openings for movement between a closed position and an open position therein, means biasing said damper into one of its said positions, a fluid motor operable responsive to fluid under pressure to place said damper in its other position, and control means for said fluid motor including a valve connected thereto and connectible with a source of fluid under pressure, and valve actuating means carried by the control member of the machine to operate said valve and thereby effect cooling of the mold only when it is closed.

3. The cooling improvement as set forth in claim 2 wherein the damper is located in the inlet opening of the conduit means.

4. An improvement for cooling a glassware forming machine of the type having at least one parison mold and one final shaping mold, driven means for opening and closing the molds including a rotating control drum having actuating means thereon effective to cause opening and closing of the molds in timed relationship to each other, the said improvement comprising at least one conduit means associated with each mold and having an outlet opening for directing cooling air onto its mold and also having a base for mounting said conduit means on the machine, the base defining an inlet opening connectible with a source of cooling air under pressure, a damper pivotally supported by each conduit means in one of its said openings for movement between a first position at least partially closing the conduit means and a second more open position, means biasing each such damper into one of its said positions, a fluid motor associated with each damper and operable responsive to fluid under pressure to place its damper in its other position, and control means for said fluid motors including a bank of valves supported adjacent said control drum with each valve in the bank connected with a respective fluid motor and also connected with a common source of fluid under pressure, and a plurality of valve actuators carried by said control drum to operate said valves in timed relationship and thereby to direct more air onto the respective molds only when they are closed.

5. An improvement for cooling a glassware forming machine of the type having at least one parison mold and one final shaping mold, driven means for opening and closing the molds including a rotating control drum having actuating means thereon effective to cause opening and closing of the molds in timed relationship to each other, the said improvement comprising at least one conduit means associated with each mold and having an outlet opening for directing cooling air onto its mold and also having a base for mounting said conduit means on the machine, the base defining an inlet opening connectible with a source of cooling air under pressure, a damper pivotally supported by each conduit means in one of its said openings for movement between a closed position and an open position therein, means biasing each such damper into one of its said positions, a fluid motor associated with each damper and operable responsive to fluid under pressure to place its damper in its other position, and control means for said fluid motors including a bank of valves supported adjacent said control drum with each valve in the bank connected with a respective fluid motor and also connected with a common source of fluid under pressure, and a plurality of valve actuators carried by said control drum to operate said valves in timed relationship and thereby to direct cooling air onto the respective molds only when they are closed.

6. The cooling improvement set forth in claim 4 wherein the damper in each conduit means is located in the inlet opening thereof, and wherein the fluid motor associated with each damper operates responsive to fluid pressure to close the associated conduit means.

References Cited

UNITED STATES PATENTS

| | | | |
|---|---|---|---|
| 1,976,239 | 10/1934 | Lorenz et al. | 65—355 X |
| 2,051,468 | 8/1936 | Cook et al. | 65—355 X |
| 2,199,355 | 4/1940 | Underwood | 65—355 X |
| 2,402,475 | 6/1946 | Waterbury et al. | 65—355 |
| 2,702,444 | 2/1955 | Rowe | 65—246 X |
| 3,235,354 | 2/1966 | Andersen | 65—355 |

DONALL H. SYLVESTER, *Primary Examiner.*

F. W. MIGA, *Assistant Examiner.*